(12) United States Patent
Li

(10) Patent No.: US 11,112,336 B2
(45) Date of Patent: Sep. 7, 2021

(54) INTELLIGENCE IDENTIFICATION METHOD FOR VIBRATION CHARACTERISTIC OF ROTATING MACHINERY

(71) Applicant: Aktiebolaget SKF, Gothenburg (SE)

(72) Inventor: Haiyang (Jackson) Li, Gothenburg (SE)

(73) Assignee: Aktiebolaget SKF, Gothenburg (SE)

( * ) Notice: Subject to any disclaimer, the term of this patent is extended or adjusted under 35 U.S.C. 154(b) by 67 days.

(21) Appl. No.: 16/785,891

(22) Filed: Feb. 10, 2020

(65) Prior Publication Data
US 2020/0256766 A1 Aug. 13, 2020

(30) Foreign Application Priority Data
Feb. 12, 2019 (CN) .......................... 201910110761.5

(51) Int. Cl.
*G06F 11/30* (2006.01)
*G01M 99/00* (2011.01)
*G01H 1/00* (2006.01)

(52) U.S. Cl.
CPC .......... *G01M 99/005* (2013.01); *G01H 1/003* (2013.01)

(58) Field of Classification Search
CPC ................................................. G01M 99/005
See application file for complete search history.

(56) References Cited

U.S. PATENT DOCUMENTS

2008/0033695 A1* 2/2008 Sahara ................... G01H 1/003
702/185
2010/0280772 A1* 11/2010 Saarinen ............. G01M 13/045
702/56

* cited by examiner

*Primary Examiner* — Phuong Huynh
(74) *Attorney, Agent, or Firm* — Garcia-Zamor Intellectual Property Law; Ruy Garcia-Zamor; Bryan Peckjian

(57) ABSTRACT

An intelligent identification method for a vibration characteristic of rotating machinery, the steps providing converting a speed or acceleration time domain signal of mechanical vibration to a frequency domain envelope spectrum by signal processing, extracting a frequency upper limit value $f_{max}$ of the envelope spectrum; at least screening out a high energy harmonic with a frequency range within $f_{max}/N_{max}$ by amplitude comparison. $N_{max}$ is a frequency multiple upper limit multiple for performing a frequency multiple check on the high energy harmonic. Then, extracting at least one set of characteristic parameters, based on respective amplitudes and/or frequencies, of 1-fold to $N_{max}$-fold frequency region peaks of each high energy harmonic. The 1-fold frequency region peak of the high energy harmonic is the high energy harmonic itself. Finally, inputting the at least one set of characteristic parameters of each high energy harmonic into a machine learning intelligent algorithm to perform training and calculation.

10 Claims, 4 Drawing Sheets

INTELLIGENCE IDENTIFICATION METHOD FOR VIBRATION CHARACTERISTIC OF ROTATING MACHINERY

CROSS-REFERENCE TO RELATED APPLICATIONS

This application claims priority to Chinese Patent Application no. 201910110761.5, filed Feb. 12, 2019, the contents of which is fully incorporated herein by reference.

FIELD OF THE INVENTION

The present invention relates to an intelligent identification method for a vibration characteristic of rotating machinery based on an envelope spectrum, in particular to an intelligent diagnosis method for a defect in rotating machinery.

BACKGROUND OF THE INVENTION

Frequency domain analysis is a common method of diagnosing mechanical defects, generally realized by converting a mechanical vibration signal (e.g. a speed or acceleration time domain signal) to a frequency domain signal. Mechanical defects in rotating machinery, such as damage to rotors, gears or bearings, will give rise to systematic oscillation or shocks. Frequency response in an envelope spectrum reflects the nature and intensity of such oscillation and shocks in a concentrated fashion, and thus can be used to accurately identify various kinds of defect in rotating machinery. Specifically, vibration and shocks give rise to a defect harmonic family in a frequency spectrum. The harmonic family includes a fundamental defect harmonic whose frequency corresponds to a mechanical defect characteristic frequency, and high frequency defect harmonics whose frequencies are integer multiples of the fundamental defect harmonic frequency. The frequencies and amplitudes of the fundamental defect harmonic and the high frequency defect harmonics are directly related to the type and severity of the mechanical defect, and thus have become the most commonly used and most visually direct identifying characteristics in mechanical defect diagnosis. At the moment, defect harmonic diagnosis mainly relies on manpower. Limited by individual ability and experience, its reliability and accuracy struggle to meet practical requirements. Furthermore, manual diagnosis cannot monitor equipment in real time; in the early stages of a defect in particular, the defect is often not easily identifiable with the naked eye, and the optimum time for carrying out maintenance is easily missed, with the result that accidents occur. Reality calls for an automated diagnosis technology that is not only accurate and reliable but can also realize real-time online monitoring.

SUMMARY OF THE INVENTION

In order to solve the abovementioned technical problem, the present invention provides an intelligent identification method for a vibration characteristic of rotating machinery, the method comprising operating steps in the following order: step 1, converting a speed or acceleration time domain signal of rotating machinery vibration to a frequency domain envelope spectrum by signal processing, and extracting a frequency upper limit value $f_{max}$ of the envelope spectrum; step 2, at least screening out a high energy harmonic with a frequency range within $f_{max}/N_{max}$ by amplitude comparison, wherein $N_{max}$ is a frequency multiple upper limit multiple for performing a frequency multiple check on the high energy harmonic; step 3, extracting at least one set of characteristic parameters, based on respective amplitudes and/or frequencies, of 1-fold to $N_{max}$-fold frequency region peaks of each high energy harmonic, wherein the 1-fold frequency region peak of the high energy harmonic is the high energy harmonic itself; and step 4, inputting the at least one set of characteristic parameters of each high energy harmonic into a machine learning intelligent algorithm to perform training and calculation.

Using the intelligent identification method above, it is not only possible to greatly increase the efficiency and accuracy with which mechanical defects are identified, but also possible to perform real-time online monitoring of rotating machinery. This kind of intelligent detection method can ensure that rotating machinery is always safely monitored during operation and has huge practical significance as well as broad application prospects.

DETAILED DESCRIPTION OF THE INVENTION

Figure 1:
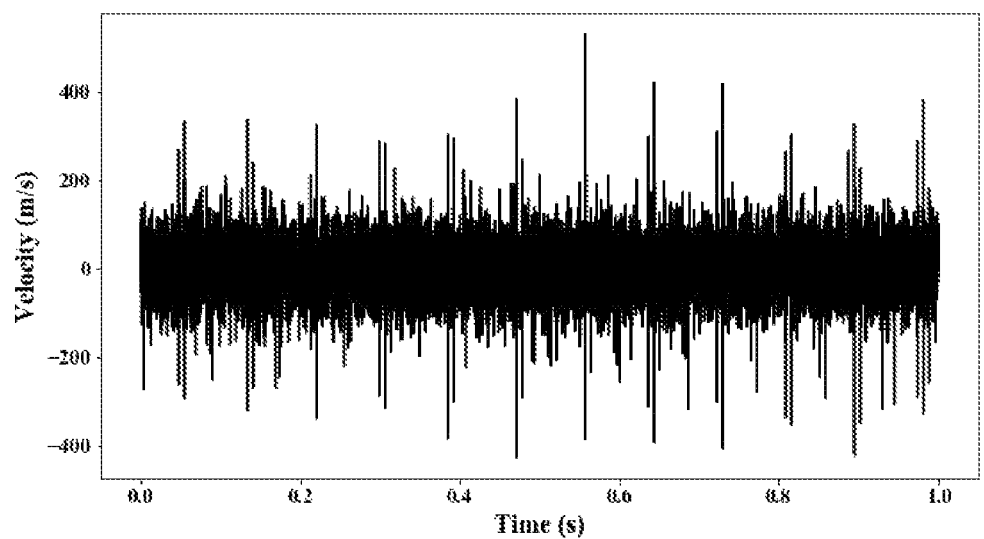
FIG. 1 is a time domain speed signal graph for rotating machinery vibration.
Figure 2:
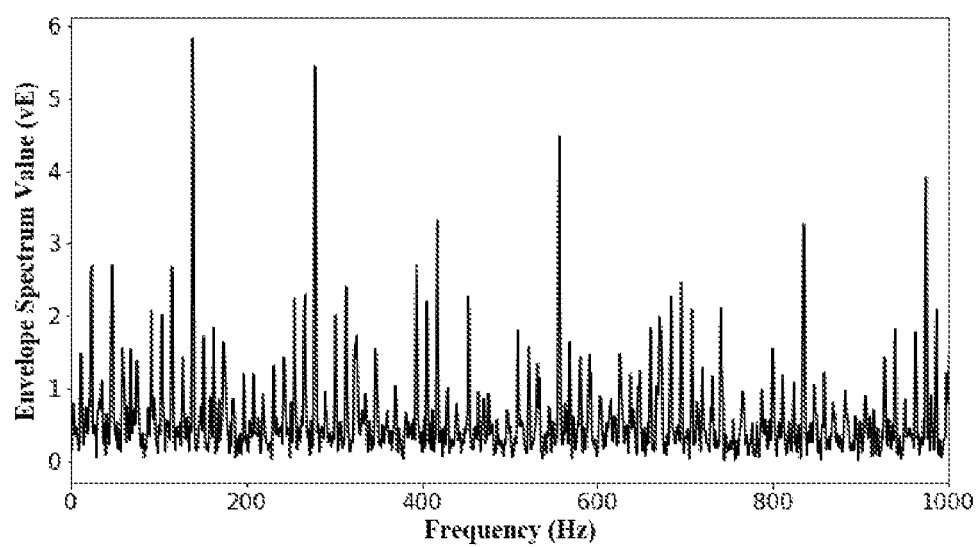
FIG. 2 is a frequency domain envelope spectrum of the time domain speed signal shown in FIG. 1.
Figure 3:
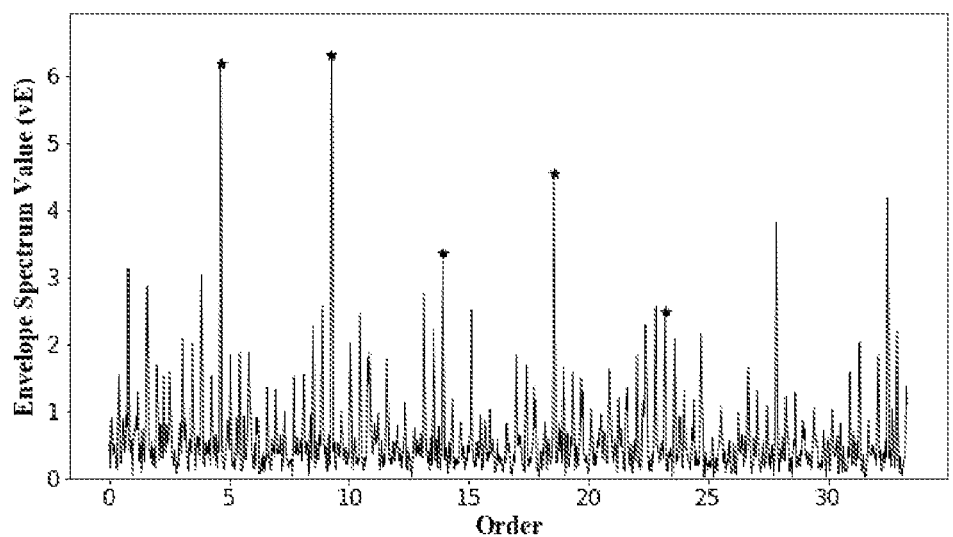
FIG. 3 is a frequency domain envelope spectrum with order as a unit.

Since speed and acceleration signals contain most of the key information of mechanical vibration, the present invention opts to convert a speed or acceleration time domain signal of mechanical vibration to a frequency domain envelope spectrum by demodulation. FIG. 1 shows a vibration speed time domain signal of a rotating machine in a stable state, wherein the horizontal axis represents time (s) and the vertical axis represents speed (m/s). The time domain signal is converted by Fourier transform to the frequency domain envelope spectrum shown in FIG. 2, wherein the horizontal axis represents frequency (Hz) and the vertical axis represents an envelope value (vE), wherein vE is a virtual value obtained after envelope transformation of the unit of speed m/s. If FIG. 1 were an acceleration time domain signal, then the unit of frequency of the horizontal axis in the envelope spectrum corresponding thereto would be Hertz (Hz), and the unit of the vertical axis would be a virtual unit (gE) obtained by envelope transformation of acceleration (m/s$^2$) (not shown in the figures). There is also an envelope spectrum in which a multiple of machine rotation speed serves as the unit of frequency, called the "order", as shown in FIG. 3. The order can reflect a frequency multiple relationship between defect harmonic and machine rotation speed, facilitating identification by comparison with a defect characteristic frequency, and thus facilitating the determination of defect nature. In FIG. 3, the signal amplitudes of some frequencies are much higher than the amplitudes of other signals, and are defined as "high energy harmonics" in the present invention, marked with an asterisk "*" in the figure. High energy harmonics come from obvious vibration generated by a machine in the course of operation, might be a member of the defect harmonic family, and in the present invention are regarded as probable defect harmonics for identification and checking.

The identification of high energy harmonics is realized by amplitude comparison in the present invention, i.e. by comparing the amplitudes of one spectrum line sample and a nearby spectrum line sample to screen out a signal individual of sufficiently high energy. The screening of high energy harmonics may be realized by seeking local peaks within a frequency spectrum range. If the height (envelope value) of one spectrum line is greater than the envelope value of a nearby spectrum line, then it is defined as a "local peak" in the present invention. The meaning of "nearby" may be defined in the present invention by a number of spectrum lines before and after a specific spectrum line sample. For example, if a range defined by k spectrum lines before and after is taken to mean "nearby", wherein k is a natural number, then when k=1, a sample signal will be identified as a local peak if it is larger than the amplitudes corresponding to the two spectrum lines at the left and right thereof. In summary, a local peak is the sample individual with the greatest amplitude within the range defined by k spectrum lines before and after.

Although it is feasible to take a local peak as a probable defect harmonic and perform a subsequent check, the mathematical operation efficiency is low. This is because local peaks, despite being "peaks", are not necessarily all of "high energy". A defect harmonic often has an energy amplitude that is much higher than that of a noise signal; thus, only a high energy harmonic that is significantly higher than a nearby signal is most likely to be a defect harmonic. Thus, it is necessary to further screen out high energy harmonics of much higher amplitude than nearby signals from the local peaks; only these high energy harmonics are most likely to be defect harmonics which need to be sought and identified.

Figure 4:
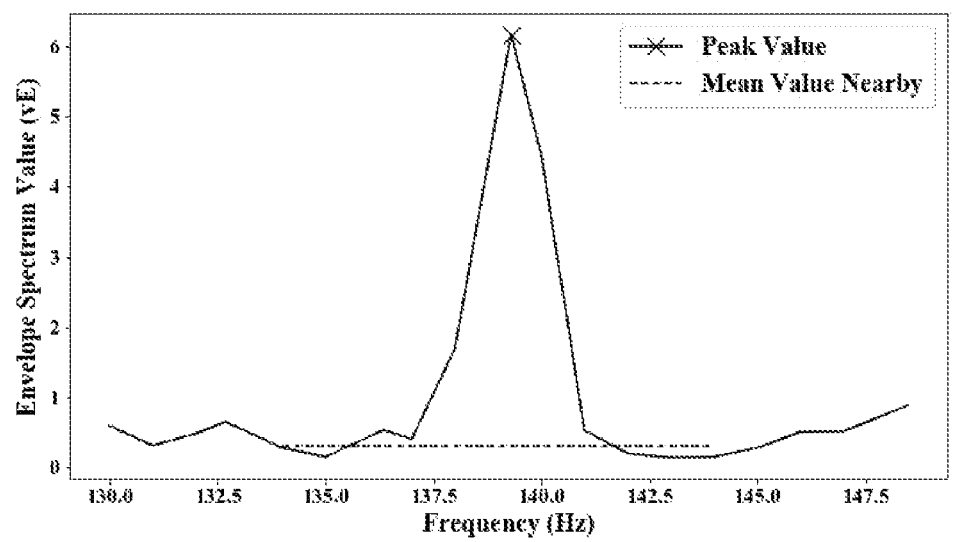
FIG. 4 is a schematic chart of the method of bamboo grass filtering.

The process of further screening out high energy harmonics (probable defect harmonics) from local peaks is referred to as "bamboo grass filtering" in the present invention. This is a metaphor, and means seeking out bamboo (high energy harmonics) from thickly growing grass (noise), wherein the bamboo has an amplitude that is obviously higher than the mean height of the thickly growing grass. Another way to describe the relationship is a signal (Bamboo) to noise (Grass)relationship. FIG. 4 shows a particular embodiment of bamboo grass filtering: a window is set within a range of j spectrum lines (j being a natural number) before and after a local peak, the mean amplitude mean($A_{-j}:A_j$) of all spectrum line samples except the local peak within the window is calculated, then the ratio of the amplitude $A_0$ of the local peak to the mean amplitude mean($A_{-j}:A_j$) of the nearby samples is calculated, thereby obtaining the bamboo grass ratio BambooGrassRatio=$A_0$/mean($A_{-j}:A_j$). Here, a preferred embodiment is to let j≥k, such that the comparison range for the bamboo grass ratio is larger than the comparison range for the local peak; this helps to improve the accuracy of identification of high energy harmonics. It is not difficult to understand that the bamboo grass ratio reflects generally the extent to which a local peak protrudes from nearby samples; only a local peak whose amplitude is considerably higher than that of nearby samples will be regarded as a high energy harmonic. To facilitate screening, a threshold such as 3.5 may be set for the bamboo grass ratio; only a local peak that is higher than the threshold will be regarded as a high energy harmonic, otherwise it will be regarded as noise.

In the embodiment shown in FIG. 4, the comparison basis (denominator) of the bamboo grass ratio is the mean value of the nearby samples of the local peak, i.e. the proportion of the mean value taken up by each nearby sample in the selected window is the same. This is inconsistent with the reality that the amplitudes of nearby samples of a defect harmonic decay in sequence, easily causing high energy harmonics to be determined erroneously or escape determination. For example, supposing two high energy harmonics happen to be near each other, each being located within the range of the selected window (j spectrum lines) of the other, then this will certainly cause the mean amplitude mean($A_{-j}:A_j$) of the nearby samples within the range of the selected window to increase, thereby causing the bamboo grass ratio of the corresponding high energy harmonic to decrease. When the bamboo grass ratio is lower than the set threshold, this will result in the corresponding high energy harmonic escaping determination.

In order to avoid the scenario described above, one feasible embodiment is to re-distribute the weights, in a mean value algorithm, of the nearby samples of the high energy harmonic. For example, a triangular distribution or normal distribution model (not shown in the figures) may be used in the selected window, giving higher weights to nearby samples close to the local peak, while nearby samples remote from the local peak are given lower weights, such that the mean amplitude mean($A_{-j}:A_j$) of the nearby samples which serves as the comparison basis is expanded from the mathematical mean to a weighted mean.

In the particular embodiment above, the mathematical mean or weighed mean, mean($A_{-j}:A_j$), serving as the comparison basis does not include the local peak $A_0$ itself. However, all persons skilled in the art should understand that it is also feasible for the local peak to be included in the process of calculating the mean. In this case, as long as an empirical threshold of the bamboo grass ratio is adjusted, it will still be possible to screen out the high energy harmonic on the basis of the mean.

The process of screening high energy harmonics within a frequency spectrum range by amplitude comparison has been described above. The combined use of local peaks and bamboo grass filtering is an effective method of rapidly screening out high energy harmonics. However, those skilled in the art should understand that any method based on amplitude comparison can achieve the objective of high energy harmonic screening according to the present invention; there is no restriction to using the specific method described above. For example, the accurate identification of high energy harmonics can also be achieved by processing the data of all spectrum line samples by bamboo grass filtering alone, but the mathematical operation efficiency is not as fast and convenient as bamboo grass filtering on the basis of local peaks.

As is well known, an envelope spectrum is a discrete spectrum obtained from a time domain signal by Fourier transform, and spectrum line samples of the envelope spectrum often deviate from the real signal in terms of amplitude, frequency and phase. For example, due to limitations imposed by sampling frequency, a real local peak should in fact lie between a local peak and a local secondary peak, and should have a higher amplitude than the local peak. In existing theory there are many methods of correcting the discrete spectrum, e.g. the ratio correction method and the energy centre-of-gravity correction method, etc., which are not developed further here. In a preferred embodiment, the present invention may opt to correct local peaks in spectrum line samples, and replace the original spectrum line sample data with the corrected data; it is thereby possible to considerably increase the data accuracy of local peaks without increasing the sampling frequency (spectrum line density), greatly helping to increase the accuracy of a subsequent machine learning intelligent algorithm with regard to defect harmonic determination. In view of the fact that all high energy harmonics are screened from local peaks, the correction process should take place after the local peak screening process, but before the bamboo grass filtering process, so as to ensure that the high energy harmonics which are screened out automatically have accurate amplitude, frequency and phase.

A description is given below of the process of using the learning ability of an intelligent algorithm to determine whether a high energy harmonic in an envelope spectrum is a member of the defect harmonic family. As shown in FIG. 3, a typical distribution of the defect harmonic family in the frequency spectrum is a series of defect harmonic components, which are in an integer multiple relationship in terms of frequency; moreover, as the frequency multiple increases, the amplitudes of the defect harmonic components decrease in sequence. Data having the abovementioned characteristic are taken to be positive samples, and data not having the abovementioned characteristic are taken to be negative samples; a large number of positive and negative samples collected are randomly divided into a training set and a test set according to a certain ratio, then the training set is used to train a model of a machine learning intelligent algorithm, and the test set is used to test the trained model. It may be put to practical use if the test result is good enough.

Figure 5:
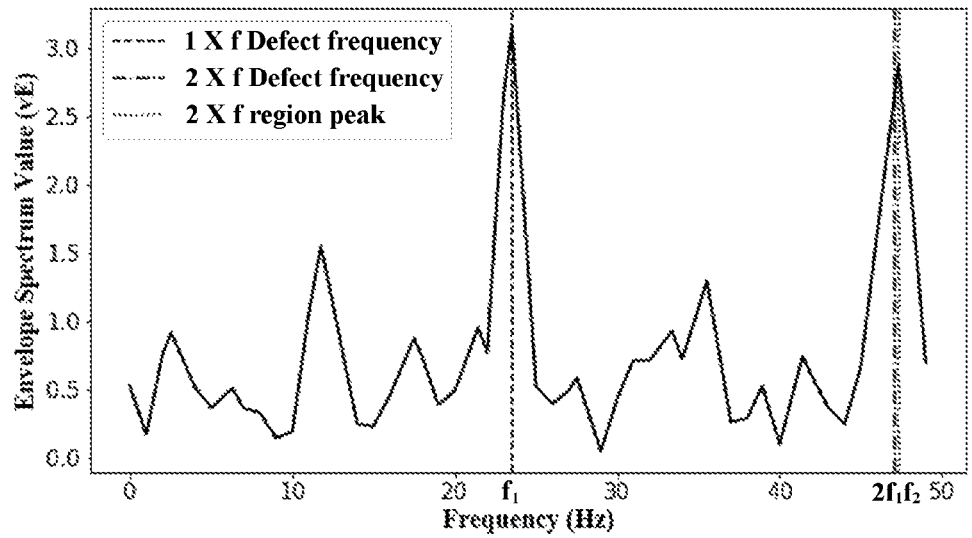
FIG. 5 is a schematic chart of a method of checking a double frequency harmonic relationship of high energy harmonics.

FIG. 5 is a schematic chart of a method of verifying a double frequency harmonic relationship of high energy harmonics. Suppose that the frequency corresponding to a first high energy harmonic at the left side of the figure is $f_1$, and the amplitude is $y_1$. If this high energy harmonic is precisely the first harmonic (i.e. "fundamental harmonic") of a defect harmonic family, then the second harmonic (i.e. "double frequency harmonic") in the same harmonic family should be present close to a double frequency $2f_1$ region of the envelope spectrum. Taking into consideration the presence of error, the method of verification is to seek a double frequency region peak $y_2=\max(2f_1)$ within a certain (window) range before and after the double frequency $2f_1$, and then extract the amplitude $y_2$ and frequency $f_2$ ($f_2 \approx 2f_1$) corresponding to the double frequency region peak.

Taking a double frequency region window defined by m spectrum lines before and after as an example (m being a natural number), the double frequency region peak $y_2$ should be the largest value $\max(ENV_{-m}:ENV_m)$ in spectrum line samples within the range defined by m spectrum lines before and after the double frequency $2f_1$, wherein m is preferably greater than or equal to j, and ENV represents the envelope value of the spectrum line samples. If the double frequency region peak ($f_2$, $y_2$) found by the above method corresponds to a high energy harmonic previously screened out, this indicates that the two high energy harmonics corresponding to frequencies $f_1$ and $f_2$ are highly likely to be first and second harmonics in the same defect harmonic family. Conversely, if the double frequency region peak ($f_2$, $y_2$) found by the above method does not correspond to any high energy harmonic previously screened out, then this indicates that the current high energy harmonic ($f_1$, $y_1$) and the double frequency region peak ($f_2$, $y_2$) thereof are highly likely to not be first and second harmonics in the same defect harmonic family. Of course, the above determination process is analysed and described according to human thinking logic. In the present invention, the abovementioned determination process is completed by machine mathematical operations in a subsequent step by a machine learning intelligent algorithm. Specifically, a set of frequencies ($f_1$, $f_2$) and/or a set of region peaks ($y_1$, $y_2$) corresponding to a single frequency region peak of a high energy harmonic (i.e. the high energy harmonic itself) and a double frequency region peak thereof are/is extracted, and serve(s) as input items of an intelligent method, obtained by a machine executing an algorithm.

It is not difficult to understand that for a specific high energy harmonic, it might be inadequate to merely verify whether a unique relationship between defect harmonic components exists between a single frequency region peak of the high energy harmonic (i.e. the high energy harmonic itself) and a double frequency region peak thereof. For accuracy, it is at least also necessary to perform the abovementioned verification for a triple frequency region peak of the high energy harmonic, i.e. seek a triple frequency region peak ($f_3$, $y_3$) within a certain frequency range before and after a triple frequency $3f_1$, wherein $f_3 \approx 3f_1$, then extract a set of frequency data ($f_1$, $f_2$, $f_3$) and/or a set of region peak data ($y_1$, $y_2$, $y_3$) corresponding to the single, double and triple frequency region peaks of the high energy harmonic, and use the data as input items of a subsequent machine learning intelligent method, or as a parameter basis of further data processing.

However, regarding the verification of the defect harmonic relationship, it is not the case that more is better. In general, harmonic components of tenfold frequency and above might have decayed to almost nothing, being almost completely drowned in noise signals (thickly growing grass) and difficult to identify. Furthermore, in the verification of a high frequency multiple relationship, due to excessive amplification of error in the fundamental harmonic frequency $f_1$, the abovementioned method for seeking a region peak according to a frequency multiple relationship might fail because the frequency multiple error is too large. Thus, frequency multiple verification of high energy harmonics should not exceed a tenfold frequency region; at most, frequencies ($f_1$, $f_2$ ... $f_{10}$) and/or amplitudes ($y_1$, $y_2$ ... $y_{10}$) corresponding to onefold to tenfold frequency region peaks are extracted as a basis for subsequent determination or data processing. However, taking into consideration the limitations imposed by computer processing capability and frequency multiple error, performing a check of the defect harmonic relationship with an upper limit of 4-fold to 7-fold frequency for a high energy harmonic is deemed more appropriate, and a check of the defect harmonic relationship with an upper limit of 5-fold to 6-fold frequency has been proven to give the best result.

The above process of performing a defect harmonic check on the first high energy harmonic at the left side of FIG. 5 is completely suitable for a second high energy harmonic at the left side. By extension, high energy harmonics in the frequency spectrum can be verified one by one by the method described above, until a frequency multiple check upper limit frequency $N_{max} \cdot f_1$ of the next high energy harmonic exceeds a frequency range upper limit $f_{max}$ of the frequency spectrum, wherein $N_{max}$ is a frequency multiple upper limit multiple for performing a frequency multiple check on a high energy harmonic. Clearly, the method of the present invention for subjecting a high energy harmonic to a defect harmonic relationship check must have the condition that the frequency multiple check upper limit frequency $N_{max} \cdot f_1$ of the high energy harmonic falls within the range of the upper limit frequency $f_{max}$ of the frequency spectrum. In other words, it must be a condition that the ratio $f_{max}/N_{max}$ of the upper limit frequency $f_{max}$ of the frequency spectrum to the frequency multiple upper limit multiple $N_{max}$ of the high energy harmonic frequency multiple check can at least cover the fundamental harmonic frequency $f_1$ of a common mechanical defect, i.e. satisfy $f_1 \leq f_{max}/N_{max}$ or $f_{max} \geq N_{max} \cdot f_1$, otherwise it will be necessary to expand the upper limit frequency $f_{max}$ of the frequency spectrum or select a smaller frequency multiple check upper limit multiple $N_{max}$ so that the frequency multiple check upper limit frequency $N_{max} \cdot f_1$ of the high energy harmonic always lies within the range of the frequency upper limit $f_{max}$ of the frequency spectrum.

Figure 6:
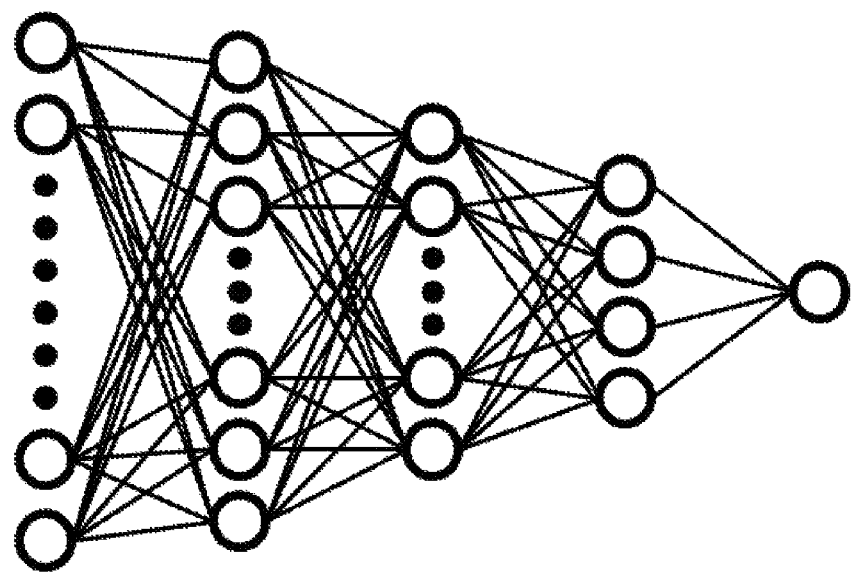
FIG. 6 is a schematic diagram of a model of a fully connected neural network.

FIG. 6 is a schematic diagram of a model of a typical fully connected neural network, being a common type of machine learning intelligent algorithm as mentioned above. Overall, the fully connected neural network employs a pyramid structure; the pyramid bottom at the left side is an input layer, the pyramid tip at the right side is an output layer, and several hidden layers are present between the pyramid bottom and the pyramid tip. The input layer comprises input units, which correspond in number to input data items; the output layer comprises at least one output unit. Taking as an example the case of a single output unit shown in the figure: suppose that when an output value is 1, a diagnosis conclusion is YES, indicating that a defect harmonic relationship has been identified; suppose that when the output value is 0, the diagnosis conclusion is NO, indicating that no defect harmonic relationship has been identified. The number of layers contained in the hidden layers, and the number of units contained in each layer, should be adapted to the number of input data items.

Taking as an example a check of the defect harmonic relationship with an upper limit of 5 times the frequency of a high energy harmonic, according to the method described above it is necessary to extract a set of frequency data $(f_1, f_2 \ldots f_5)$ and/or a set of amplitude data $(y_1, y_2 \ldots y_5)$ corresponding to 1-fold to 5-fold frequency region peaks of the high energy harmonic. One embodiment is to input the set of frequency data $(f_1, f_2 \ldots f_5)$ into a neural network having an input layer of five input units, and the trained neural network can then give out an output value at an output unit, to determine whether this set (5 items) of frequency data corresponds to a defect harmonic family. Another embodiment is to input the set of amplitude data $(y_1, y_2 \ldots y_5)$ into a neural network having an input layer of five input units, and the trained neural network can then give out an output value at an output unit, to determine whether this set (5 items) of amplitude data corresponds to a defect harmonic family. In order to increase the accuracy of intelligent diagnosis, a preferred embodiment is to simultaneously input the data of the set (5 items) of frequencies and the set (5 items) of amplitudes mentioned above (10 items in total) into a neural network having 10 input units, and the trained neural network can then give out an output value at an output unit, to determine whether the 1-fold to 5-fold frequency region peaks of the high energy harmonics corresponding to the data of these two sets (10 items in total) have the defect harmonic family relationship unique to a mechanical defect. When all high energy harmonics within the $f_{max}/5$ frequency range have been subjected to the abovementioned check one by one, then as long as the diagnosis result for one set of high energy harmonics is YES, this indicates the existence of a mechanical defect harmonic family, hence the system is diagnosed as having a defect.

In view of the powerful functions of neural networks, the data serving as input items thereof is not limited to the abovementioned frequencies and/or amplitudes themselves, but may also be derived data of frequency and amplitude, including but not limited to their respective function values, statistical values, comparison values, etc. Taking frequency as an example, derived data thereof may be frequency multiple deviation degree, $dev(f_n) = |f_n - nf_1|/f_{width}$, wherein $f_{width}$ is the frequency width of spacing of spectrum lines, and n is an integer in the range of 1 to $N_{max}$. The physical meaning of the frequency multiple deviation degree $dev(f_n)$ is the ratio of frequency deviation between a real frequency $f_n$ corresponding to a frequency multiple region peak and an anticipated defect harmonic frequency multiple $nf_1$ relative to the frequency width $f_{width}$. A larger value of the frequency multiple deviation degree $dev(f_n)$ indicates a greater degree of deviation between the frequency multiple region peak frequency $f_n$ and the expected frequency multiple $nf_1$ of the high energy harmonic, signifying a smaller possibility that the high energy harmonic being checked is a defect harmonic; a smaller value of the frequency multiple deviation degree $dev(f_n)$ indicates a smaller degree of deviation between the frequency multiple region peak frequency $f_n$ and the expected frequency multiple $nf_1$ of the high energy harmonic, signifying a greater possibility that the high energy harmonic being checked is a defect harmonic. As derived data of frequency, the data of a set of frequency multiple deviation degrees $(dev(f_1), dev(f_2) \ldots dev(f_{N_{max}}))$ may independently or additionally serve as input items of a neural network, reflecting whether the unique frequency multiple relationship between defect harmonic family members exists between a frequency multiple region peak and a tested high energy harmonic, from the dimension of degree of frequency multiple matching.

It is not difficult to see that the frequency multiple deviation degree $dev(f_n)$ is a relative value function, of a size related to the denominator serving as the comparison reference. Although the frequency width $f_{width}$ of spectrum lines is used as the reference for comparison (the denominator) in the expression for $dev(f_n)$ above, it is also feasible to select another measure, e.g. the width of a set window, as the reference for comparison, and this would have no effect at all on a mathematical operation result of a machine learning intelligent algorithm.

It is also necessary to point out that when n=1, $dev(f_1)=0$. This is because a high energy harmonic and the single frequency region peak thereof are in fact the same signal, so there is no frequency deviation therebetween. Clearly, using the single frequency deviation degree $dev(f_1)$, whose value is always zero, as an input item of an intelligent algorithm is in fact ineffective in the determination of the existence of a defect harmonic family. Thus, a set of frequency multiple deviation degree data inputted into a neural network may only include $(dev(f_2) \ldots dev(f_{N_{max}}))$, without $dev(f_1)$, and it is thereby possible to eliminate one input unit taking up the neural network. Nevertheless, taking into account the neatness of data, it is also feasible to use a set of complete frequency multiple deviation degree data $(dev(f_1), dev(f_2) \ldots dev(f_{N_{max}}))$ as input items of an intelligent algorithm, and this would not have a substantive impact on a determination result.

It can also be seen from the formula for the frequency multiple deviation degree $dev(f_n)$ above that in the method for checking a high energy harmonic by means of frequency and/or derived data thereof (collectively referred to below as "frequency-based characteristic parameters"), the degree of deviation will increase as the checked frequency multiple number n increases; this is because the deviation between the frequency $f_n$ of the frequency multiple region peak and the expected frequency multiple frequency $nf_1$ of the defect harmonic will gradually be amplified as the frequency multiple number increases, making it difficult for a machine learning intelligent method to make a correct determination. This explains, from the perspective of frequency multiple deviation, why the frequency multiple check upper limit multiple $N_{max}$ for a high energy harmonic should not be set too high in the present invention, and explains, from the perspective of reducing the error, the necessity of correcting all local peaks within the frequency spectrum range. In the latter case, all local peaks have been corrected, and therefore the high energy harmonics screened out therefrom have certainly been corrected. The corrected high energy harmonics have characteristic parameters which are closer to the true situation, greatly helping a machine learning intelligent method to make a correct determination when a frequency multiple check is performed.

Similar to the case of frequency, amplitude may also have its own derived data; for example, the bamboo grass ratio mentioned above is a typical type of amplitude derived data. Thus, the ratios (BambooGrassRatio($y_1$), BambooGrassRatio($y_2$) . . . BambooGrassRatio($y_{N_{max}}$)) of the data of 1-fold to $N_{max}$-fold frequency region peaks ($y_1, y_2 \ldots y_{N_{max}}$) of a high energy harmonic to the (weighted) mean values of their respective nearby samples form a set of amplitude derived data. Such a set of amplitude derived data may independently or additionally serve as input items of a neural network, reflecting the extent to which the 1-fold to $N_{max}$-fold frequency region peaks of the high energy harmonic protrude from nearby samples in a designated window, from the dimension of relative height. Similar to the case of frequency, amplitudes and/or derived data thereof are referred to as "amplitude-based characteristic parameters" in the present invention.

It is not difficult to understand that the bamboo grass ratio is not the only form of derived data of amplitude. In the field of artificial intelligence, a Sigmoid function (Sigmoid(x)=1/(1+$e^{-x}$)=$e^x$/($e^x$+1)) is often used to convert a quantity value x within a large range to a function value Sigmoid(x) within a small range. In a particular embodiment, the present invention actually uses a bamboo grass ratio adjustment function formula S(BambooGrassRatio)=Sigmoid(2.4·BambooGrassRatio−6.6) to further "compress" the bamboo grass ratio BambooGrassRatio, which has a value ranging from zero to a few tens, to a bamboo grass ratio Sigmoid adjustment function S, which has an amplitude in the range of 0-1; the latter is in fact a coefficient formed by mathematical adjustment of the bamboo grass ratio, and is therefore also abbreviated as "bamboo grass ratio coefficient" in the present invention.

Figure 7:
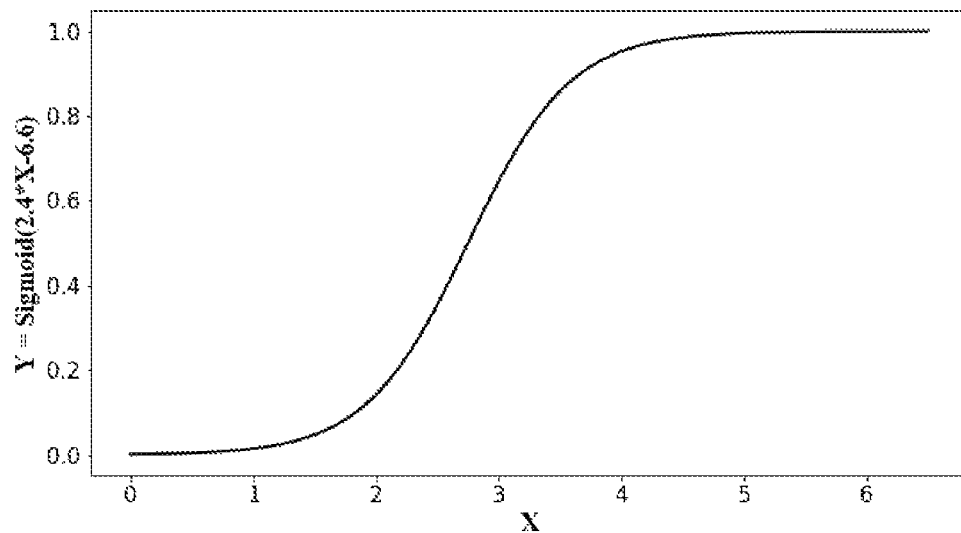
FIG. 7 is a variable relationship graph of a Sigmoid adjustment function used in the present invention.

FIG. 7 is a variable relationship graph of the bamboo grass ratio Sigmoid adjustment function actually used in the present invention, wherein the horizontal axis represents the bamboo grass ratio BambooGrassRatio, and the vertical axis represents the bamboo grass ratio coefficient S. It can be seen from the graph that when the value of the bamboo grass ratio coefficient S approaches 1, this indicates that the region peak is significantly higher than the (weighted) mean of nearby samples in the set window; when the value of the bamboo grass ratio coefficient S approaches 0, this indicates that the region peak is not significantly higher than the (weighted) mean of nearby samples in the set window; a middle value (threshold) between significance and insignificance is set at 2.75, i.e. when the bamboo grass ratio BambooGrassRatio is equal to 2.75, the bamboo grass ratio coefficient S is precisely the middle value 0.5.

Figure 8:
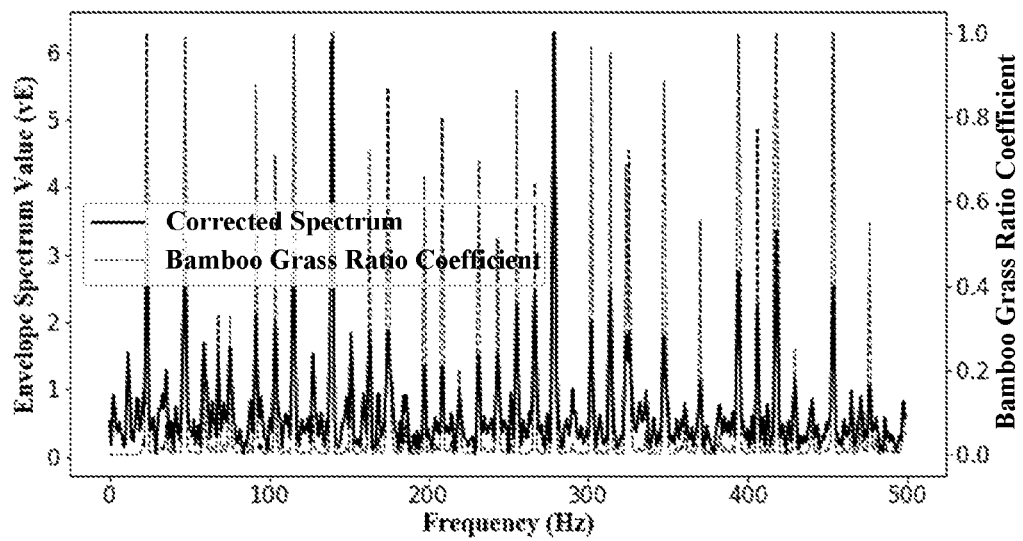
FIG. 8 is a comparison graph of the relationship between an envelope spectrum and a corresponding bamboo grass ratio coefficient.

FIG. 8 is a comparison graph of the relationship between the envelope spectrum and the corresponding bamboo grass ratio coefficient. It can be seen from the graph that the bamboo grass ratio coefficients marked by the dotted lines are for the most part distributed close to regions of "two poles" where the values approach 0 and 1. This characteristic is in fact a result of the polarizing "stretch" effect of the Sigmoid function. Thus, compared with the bamboo grass ratio, the bamboo grass ratio coefficient as an input item of a machine learning intelligent algorithm is of more assistance to the machine intelligent algorithm in performing classification determination. Thus, a set of bamboo grass ratio coefficients ($S_1, S_2 \ldots S_{N_{max}}$) independently or additionally serving as input items of a neural network, can also reflect the extent to which frequency region peaks of a high energy harmonic protrude from nearby samples in a designated window, from the dimension of relative height.

In a preferred embodiment, the present invention may simultaneously use a set of amplitude data ($y_1, y_2 \ldots y_{N_{max}}$), a set of bamboo grass ratio coefficient data ($S_1, S_2 \ldots S_{N_{max}}$) and a set of frequency multiple deviation degree data (dev($f_1$), dev($f_2$) . . . dev($f_{N_{max}}$)) corresponding to 1-fold to $N_{max}$-fold frequency region peaks of a high energy harmonic as input items of a neural network, to determine whether the current high energy harmonic is a defect harmonic from the three dimensions of absolute amplitude, relative amplitude and degree of frequency matching, thereby increasing the accuracy of intelligent identification to a huge extent.

A neural network is used as an example of an intelligent algorithm above to describe the entire process of how characteristic parameters of a high energy harmonic are inputted into a machine learning intelligent algorithm to perform mechanical defect diagnosis. It is not difficult to understand that any other type of intelligent algorithm, such as a logic regression algorithm or a random forest algorithm, can achieve the objective of intelligent identification of the present invention as long as the algorithm has the ability to learn from training set data samples.

In general, the vast majority of defects of rotating machinery are related to a rotor thereof, e.g. rotor imbalance or rotor misalignment, etc., therefore a rotation frequency of the rotor may be used to check whether a result of intelligent identification is correct. Suppose that the result of intelligent identification is YES, indicating that a high energy harmonic has a corresponding defect harmonic family; then by comparing the high energy harmonic with the rotation frequency of the rotor to ascertain whether they are the same, it is possible to check whether the result of intelligent identification is correct. Taking a bearing as an example, by comparing the frequency of a high energy harmonic with defect characteristic frequencies (fundamental fault frequencies) of the bearing, e.g. inner race defect characteristic frequency (ball pass frequency inner race, abbr. BPFI), outer race defect characteristic frequency (ball pass frequency outer race, abbr. BPFO) and roller defect characteristic frequency (ball pass frequency, abbr. BPF), etc., it is possible to further confirm whether a defect is caused by the bearing. Similarly, by comparing the frequency of the high energy harmonic with gear defect characteristic frequencies such as gear rotation frequency, gear mesh frequency and gear intrinsic frequency, it is possible to determine whether the defect is caused by a gear system. Clearly, characteristic frequencies of rotating machinery not only can be used to check a result of intelligent identification, but are also helpful in determining the nature and source of a defect, thereby making it easier to adopt preventive or maintenance measures in a targeted manner.

It can be seen from the descriptions above that the use of defect characteristic frequencies to check the result of intelligent identification is not limited to machinery components such as rotors, bearings and gears, but in theory should be suitable for all types of rotating machinery. In the above checking process, the frequency $f_1$ of the high energy harmonic corresponding to the fundamental defect frequency of equipment is a characteristic parameter necessary for performing the above check. Of course, this does not prevent a set of frequency data $(f_1, f_2 \ldots f_5)$ from being used as input items of a machine learning intelligent algorithm, for a frequency multiple check of the high energy harmonic as described above.

Mechanical vibration is inevitably embodied as a characteristic parameter in a frequency spectrum, regardless of whether it includes a mechanical defect. In this sense, the method of the present invention for identifying mechanical defects on the basis of characteristic parameters in the frequency spectrum can in fact have a wide range of uses, with no restriction to the identification and diagnosis of mechanical defects. Taking vibration and noise as examples, vibration gives rise to noise, but noise is not necessarily caused by a defect. The present invention uses the learning ability of an intelligent algorithm, training an algorithm model by means of a training set, and can automatically match and associate the human auditory perception of noise with characteristic parameters in the frequency spectrum, thereby leading people towards a new understanding of the sources of noise and the mechanisms by which noise is generated. In this sense, the present invention is in fact an intelligent method for determining and identifying the cause of a vibration characteristic of rotating machinery and the mechanism by which it is created, on the basis of the vibration characteristic.

Still taking the field of bearings as an example, noise is a common problem. The present invention may be used to identify bearing noise, or to analyse the mechanism by which noise is generated in a bearing. Current bearing noise standards only pay attention to a small number of indices such as the bearing's vibration speed peak value and vibration speed crest factor, but these indices are not necessarily all sources of bearing noise. Using an intelligent algorithm, and based on characteristic parameters in a frequency spectrum, the present invention can surpass the limited cognition which humans have at the present time, guiding people to explore the deep mechanism by which noise is generated, so as to adopt measures in practice in a targeted manner to reduce the noise level of bearings. Those skilled in the art should understand that the intelligent identification method for characteristic parameters described above is not limited by particular embodiments. Any changes and improvements to the present invention are included in the scope of protection thereof as long as they are in conformity with the definitions of the attached claims.

The invention claimed is:

1. Intelligent identification method for a vibration characteristic of rotating machinery, comprising steps in the following order:
   step 1, converting a speed or acceleration time domain signal of mechanical vibration to a frequency domain envelope spectrum by signal processing, and recording a frequency upper limit value $f_{max}$ of the envelope spectrum;
   step 2, at least screening out a high energy harmonic with a frequency range within $f_{max}/N_{max}$ by amplitude comparison, wherein $N_{max}$ is a frequency multiple upper limit multiple for performing a frequency multiple check on the high energy harmonic;
   step 3, extracting at least one set of characteristic parameters, based on respective amplitudes and/or frequencies, of 1-fold to $N_{max}$-fold frequency region peaks of each high energy harmonic, wherein the 1-fold frequency region peak is the high energy harmonic itself; and
   step 4, inputting the at least one set of characteristic parameters of each high energy harmonic into a machine learning intelligent algorithm to perform training and calculation.

2. Intelligent identification method according to claim 1, wherein the at least one set of characteristic parameters comprises at least one of the following three sets of characteristic parameters: a set of absolute amplitude data, a set of relative amplitude data and a set of frequency derived data of the 1-fold to $N_{max}$-fold frequency region peaks of each high energy harmonic.

3. Intelligent identification method according to claim 2, wherein the set of relative amplitude data is a set of bamboo grass ratio data ((BambooGrassRatio $y_1$), BambooGrassRatio ($y_2$) ... BambooGrassRatio($y_{N_{max}}$)) or a set of bamboo grass ratio coefficient data $(S_1, S_2 \ldots S_{N_{max}})$, and the set of frequency derived data is a set of frequency multiple deviation degree data (dev($f_1$), dev ($f_2$) ... dev($f_{N_{max}}$)).

4. Intelligent identification method according to claim 1, wherein the amplitude comparison in step 2 comprises sub-steps in the following order:
   sub-step A, screening of local peaks;
   sub-step B, correction of local peaks, and replacing original values with corrected values; and
   sub-step C, bamboo grass filtering.

5. Intelligent identification method according to claim 4, wherein the bamboo grass filtering uses a triangular model or normal distribution model to distribute weight coefficients of comparison samples in a nearby window.

6. Intelligent identification method according to claim 1, wherein the value of the frequency multiple upper limit multiple $N_{max}$ is in the range of 3 to 10.

7. Intelligent identification method according to claim 6, wherein the value of the frequency multiple upper limit multiple $N_{max}$ is in the range of 4 to 7.

8. Intelligent identification method according to claim 7, wherein the value of the frequency multiple upper limit multiple $N_{max}$ is in the range of 5 to 6.

9. Intelligent identification method according to claim 1, wherein the machine learning intelligent algorithm is a fully connected neural network, comprising a layer structure distribution and an input unit quantity adapted to the quantity of the at least one set of characteristic parameters.

10. Intelligent identification method according to claim 1, further comprising a step 5: checking whether a frequency of the high energy harmonic is the same as a defect characteristic frequency of the rotating machinery.

* * * * *